United States Patent [19]

Lelong et al.

[11] Patent Number: 5,444,478
[45] Date of Patent: Aug. 22, 1995

[54] IMAGE PROCESSING METHOD AND DEVICE FOR CONSTRUCTING AN IMAGE FROM ADJACENT IMAGES

[75] Inventors: Pierre Lelong, Nogent/Sur/Marne, France; Govert Dalm, Veldhoven; Jan Klijn, Breda, both of Netherlands

[73] Assignee: U.S. Philips Corporation, New York, N.Y.

[21] Appl. No.: 174,091

[22] Filed: Dec. 28, 1993

[30] Foreign Application Priority Data

Dec. 29, 1992 [FR] France ............................ 92 15836

[51] Int. Cl.⁶ .............................................. H04N 7/18
[52] U.S. Cl. ........................................ 348/39; 348/38
[58] Field of Search ................... 348/36, 39, 580, 383, 348/37, 38; 382/41

[56] References Cited

U.S. PATENT DOCUMENTS

| | | |
|---|---|---|
| 4,660,157 | 4/1987 | Beckwith . |
| 4,677,576 | 6/1987 | Berlin, Jr. et al. . |
| 4,740,839 | 4/1988 | Phillips ............... 358/108 |
| 4,772,942 | 9/1988 | Tuck ...................... 348/38 |
| 5,023,725 | 6/1991 | McCutchen ............ 348/38 |
| 5,130,794 | 7/1992 | Ritchey ................. 348/383 |
| 5,185,667 | 2/1993 | Zimmermann ........ 348/36 |
| 5,187,571 | 2/1993 | Braun et al. ............ 348/39 |
| 5,200,818 | 4/1993 | Neta et al. ............. 348/36 |
| 5,262,867 | 11/1993 | Kojima .................. 348/39 |

Primary Examiner—Tommy P. Chin
Assistant Examiner—A. Au
Attorney, Agent, or Firm—Edward W. Goodman

[57] ABSTRACT

A method of processing images for constructing a target image (Io) from adjacent images having a fixed frame line and referred to as source images (I1, ..., Ii, Ij, ..., In), the source and target images having substantially common view points. This method includes the steps of: digitizing the images, determining, for one of the pixels of the target image (Io), the address (Aq) of a corresponding point in one of all source images (Ij), determining the luminance value (F) at this corresponding point, assigning the luminance value (F) of this corresponding pixel to the initial pixel in the target image (Io), and repeating these steps for each pixel of the target image (Io). A device for performing this method includes a system of n fixed real cameras (C1, ..., Cn) which provide n adjacent source images (I1, ..., In) covering a wide-angle field of view and which have common view points (P), and an image reconstruction system (100) simulating a mobile camera referred to as target image (Co) for providing a sub-image referred to as target image (Io) of the wide-angle field of view, and constructed on the basis of source images having the same view point (P).

17 Claims, 6 Drawing Sheets

IMAGE PROCESSING METHOD AND DEVICE FOR CONSTRUCTING AN IMAGE FROM ADJACENT IMAGES

BACKGROUND OF THE INVENTION

1. Field of the Invention

The invention relates to a method of processing images for constructing a target image from adjacent images having a fixed frame line and referred to as source images, said source and target images having substantially common view points.

The invention also relates to an image processing device comprising:
- a system of n fixed real cameras arranged in such a way that their individual fields of view merge so as to form a single wide-angle field of view for observation of a panoramic scene,
- an image construction system simulating a mobile, virtual camera continuously scanning the panoramic scene so as to form a sub-image referred to as target image corresponding to an arbitrary section of the wide-angle field of view and constructed from adjacent source images furnished by the n real cameras, said virtual camera having a view point which is common with or close to that of the real cameras.

The invention is used in the field of telemonitoring or in the field of television where shots covering large fields are necessary, for example when recording sports events. The invention is also used in the field of automobile construction for realizing peripheral and panoramic rear-view means without a blind angle.

2. Description of the Related Art

An image processing device is known from Patent Application WO 92-14341, corresponding to U.S. Pat. No. 5,187,571. This document describes an image processing system for television. This device comprises a transmitter station including a plurality of fixed cameras arranged adjacent to each other so that their fields of view merge and form a wide-angle field of view. This system also comprises a processing station including means for generating a composite video signal of the overall image corresponding to the wide-angle field of view, and means for selecting a sub-image from this composite image. This system also comprises means, such as a monitor, for displaying this sub-image. This sub-image corresponds to a field of view having an angle which is smaller than that of the composite image and is referred to as sub-section of the wide-angle field of view.

This image processing device is solely suitable for conventional television systems in which the image is formed line by line by means of a scanning beam.

The processing station enables a user to select the sub-section of the wide-angle field of view. The corresponding sub-image has the same dimension as the image furnished by an individual camera. The user selects this sub-image by varying the starting point of the scan with respect to the composite image corresponding to the wide-angle field of view. The wide-angle field of view has an axis which is parallel to the video scan, with the result that the starting point for the video scan of the sub-image may be displaced arbitrarily and continuously parallel to this axis.

The angle of the field of view to which the sub-image corresponds may be smaller than that of a real camera. However, the localization of the sub-image does not include a displacement perpendicular to the scan; its localization only includes displacements parallel to this scan. The formation of the sub-image does not include the zoom effect with respect to the composite image, i.e. the focal change of the sub-image with respect to the focal length of the image pick-up cameras.

The image processing station thus comprises means for constructing the selected video sub-image line after line. These means essentially include a circuit for controlling the synchronization of the video signals from the different cameras.

SUMMARY OF THE INVENTION

It is an object of the present invention to provide a device which is capable of simulating a mobile camera scanning the wide-angle field of view covered by the n fixed cameras whose fields of view merge.

A particular object of the present invention is to provide such a device simulating a camera which is provided with all the facilities of a real existing mobile camera, i.e. from a stationary observer, possibilities of horizontal angular displacements towards the left or the right of a panoramic scene to be observed or to be monitored, possibilites of vertical angular displacements to the top or the bottom of this scene, possibilities of rotation and also possibilities of zooming in on a part of the surface area of this scene.

This object is achieved by performing a method of processing images for constructing a target image from adjacent images having a fixed frame line and referred to as source images, said source and target images having substantially common view points, characterized in that the method comprises the steps of:
- digitizing the images,
- determining, for one of the pixels of the target image, the address of a corresponding point in one of all source images,
- determining the luminance value at this corresponding point,
- assigning the luminance value of this corresponding pixel to the initial pixel in the target image,
- repeating these steps for each pixel of the target image.

According to the invention, for performing this method, an image processing device is also proposed, which device includes:
- a system of n fixed real cameras arranged in such a way that their individual fields of view merge so as to form a single wide-angle field of view for observation of a panoramic scene,
- an image construction system simulating a mobile, virtual camera continuously scanning the panoramic scene so as to form a sub-image referred to as target image corresponding to an arbitrary section of the wide-angle field of view and constructed from adjacent source images furnished by the n real cameras, said virtual camera having a view point which is common with or close to that of the real cameras, characterized in that this image processing device is a digital device and in that the system (100) for constructing the target image Io includes:
- an address computer for causing a point at an address in one of the source images to correspond to a pixel address in the target image,
- means for computing the luminance value of the point at the address found in the source image and for assigning this luminance value to the initial pixel at the address in the target image.

Thus, the device according to the invention provides the possibility of constructing a target image like the one furnished by a supposed camera which is being displaced in a continuous manner; this target image is formed from several adjacent source images each provided by one camera from a group of cameras arranged in a fixed manner with respect to the scene to be observed, and, based on this construction, this device may furnish, by way of display on the screen, or by way of recording:

either a sequential image-by-image read-out of partitions of the observed scene, possibly with a zoom effect, or a continuous read-out by scanning the scene observed with the sight and azimuth effect or with rotation.

In a particular embodiment, this device is characterized in that the target image reconstruction system comprises:

first means for storing the parameters relating to the virtual camera for supplying the address computer with the scale factor and the orientation of the optical axis of the virtual camera in a fixed orthonormal landmark which is independent of the cameras, i.e. the azimuth angle, the angle of sight and the angle of rotation;

second means for storing the parameters relating to the real cameras for supplying the address computer with the scale factor and the orientation of the optical axis of each real camera, i.e. their azimuth angle, the angle of sight and the angle of rotation in said fixed landmark;

an address generator for generating, pixel by pixel, the addresses (Ao) of the pixels of the target image so as to cover the entire target image, the address computer determining the particular source image and the point at the address (Aq) in this source image, which corresponds to each pixel of the target image, on the basis of the parameters of the virtual camera and the real cameras.

Another technical problem is posed by the construction of the target image. It is supposed that a plurality of cameras is arranged adjacent to one another and that no zone of the panoramic scene to be constructed is beyond the field covered by each camera: it is thus supposed that all the data for constructing the target image are provided. Nevertheless, at each boundary between the cameras, where an image from one camera passes to another image of an adjacent camera, the viewing angle difference between these two cameras for two adjacent zones of the scene recorded by these two different cameras causes great distortions of the image. The result is that the partitions which are realized on and at both sides of the two zones of the scene recorded by two different cameras are very difficult to display and completely lack precision.

It is another object of the invention to provide a construction of the target image whose image distortion at the boundary between two cameras is corrected so that this (these) boundary(ies) is (are) completely invisible to the user.

This object is achieved by means of an image processing device as described hereinbefore, which is characterized in that the address computer comprises:

first means for constructing a model (MCo) of the virtual camera with a projection via the view point, second means for constructing models (MC1-MCn) of the real cameras with a projection via the view point and with corrections of distortions and perspective faults.

In a particular embodiment, this device is characterized in that the address computer comprises:

first means for computing the geometrical transform for applying a geometrical transform referred to as inverse "perspective transform" ($H_o^{-4}$) to each pixel at an address (Ao) of the image of the virtual camera, in which transform the model (MCo) of the virtual camera provided by the first construction means and the parameters for the azimuth angle, the angle of sight, the angle of rotation and the scale factor of this virtual camera provided by the first storage means are taken into account for determining, on the basis of this inverse perspective transform ($H_o^{-4}$), the positioning in said landmark of the light ray passing through this pixel and the view point, means for storing the position of the light ray obtained by the inverse perspective transform ($H_o^{-4}$), means for selecting the particular source image traversed by this light ray, second means for computing the geometrical transform for applying a geometrical transform referred to as "direct perspective transform" (H1-Hn) to this light ray in said landmark, in which transform the models of the real cameras provided by the second construction means, the parameters for the azimuth angle, the angle of sight, the angle of rotation and the scale factor of the corresponding real camera provided by the second storage means are taken into account, and storage means for supplying, on the basis of this direct perspective transform (H1-Hn), the address (Aq) in the particular source image which corresponds to the light ray and thus to the pixel of the address (Ao) in the target image.

With this device, the user who monitors a panoramic scene exactly obtains the same convenience of use and the same service as a user of a mobile camera with zoom and mechanical means for realizing the variation of the orientation of the optical axis, i.e., for realizing variations of sight and azimuth, as well as rotations around the optical axis of the camera. The advantage is that the mechanical means are not necessary. These mechanical means, which include mechanical motors for rotating the azimuth angle and the angle of sight and a motor for zoom control always have drawbacks: first, they may get blocked and then the generated displacements are very slow. Moreover, they are very expensive. As they are most frequently installed externally, they will rapidly degrade because of poor weather conditions. The electronic image processing means according to the invention obviate all these drawbacks because they are very precise, reliable, very rapid and easy to control. Moreover, they may be installed internally and thus be sheltered from bad weather. The electronic means are also easily programmable for an automatic function. Finally, they are less costly than the mechanical means.

With the means according to the invention, the user thus obtains an image which is free from distortions and has a greater precision and an easier way of carrying out the sighting operations than with mechanical means. Moreover, a panoramic scene of a larger field may be observed because fields of 180° or even 360°, dependent on the number of cameras used, can be observed. The operations can also be easily programmed.

Great progress is achieved as regards surveillance. As for realizing panoramic rear-view means for automobiles, this progress is also very important.

The fact that several cameras are used for acquiring data which are necessary for constructing the target image is not a disadvantage, because such an assembly of fixed CCD cameras has become less difficult to handle than the mechanical devices for varying the sight, azimuth and rotation, as well as the zoom for a single real mobile camera.

In a particular embodiment, this system is characterized in that the means for determining the luminance comprise:

an interpolator for computing a most probable value of a luminance function (F) at the address (Aq) found by the address computer in the source image furnished by the selection means;

third storage means for assigning the luminance value (F) corresponding to the point at the address (Aq) found in the source image to the initial pixel in the target image at the address (Ao) furnished by the address generator, and in that the system for reconstructing the target image also comprises:

an interface for enabling a user to define the parameters of the virtual camera, which parameters include the scale factor and the orientation of the optical axis.

These and other aspects of the invention will be apparent from and elucidated with reference to the embodiments described hereinafter.

BRIEF DESCRIPTION OF THE DRAWINGS

In the drawings

FIG. 1B shows the landmark Px, Py, Pz viewed in projection in the horizontal plane;

DESCRIPTION OF THE PREFERRED EMBODIMENT

I/The image pick-up system.

Figure 1A:
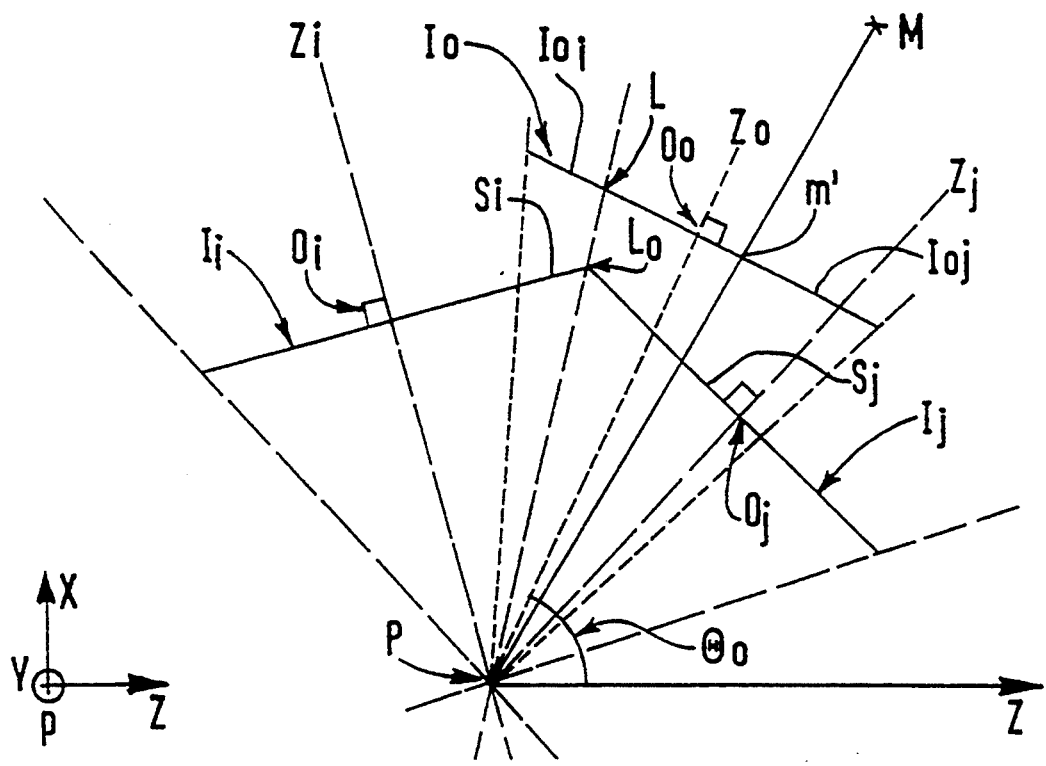
FIG. 1A is a plan view showing the traces of the different image planes in the horizontal plane of the landmark in the case where the real cameras have image planes which are perpendicular to this horizontal plane.
Figure 1C:
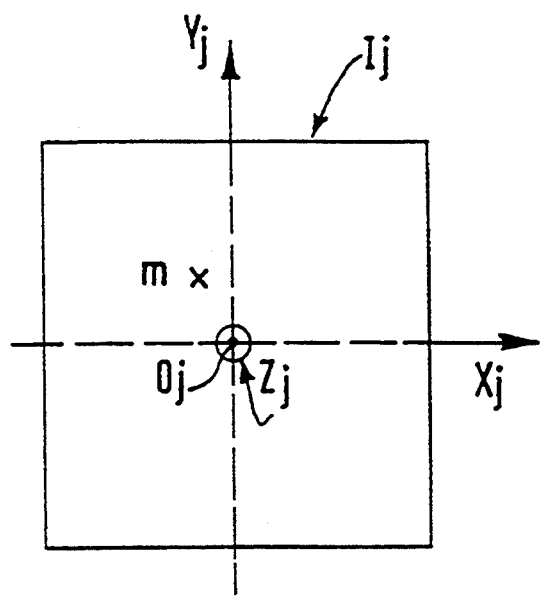
FIG. 1C is an elevational view of a source image plane with its particular system of coordinate axes.
Figure 1D:
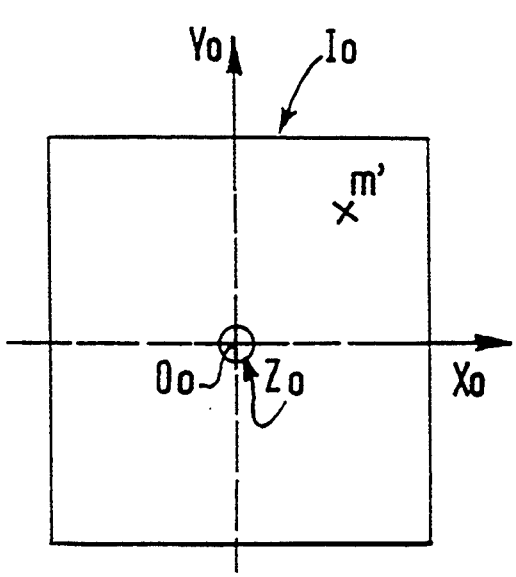
FIG. 1D is an elevational view of the target image plane with its particular system of coordinate axes.
Figure 1E:
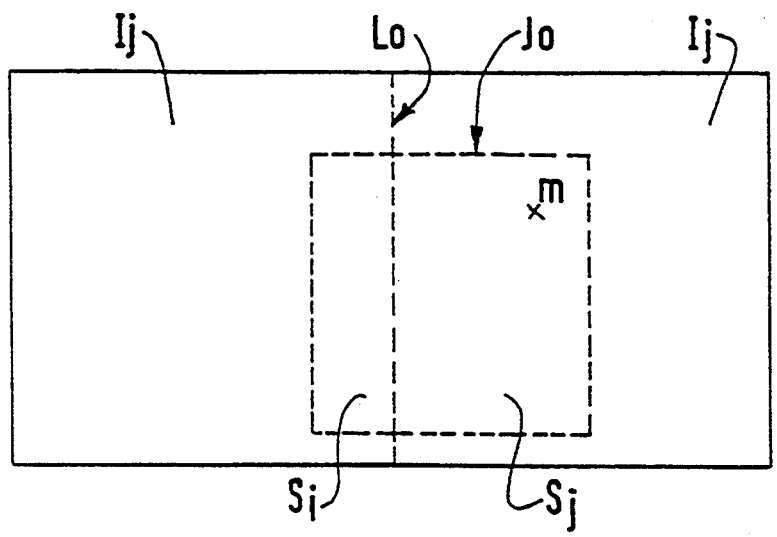
FIG. 1E represents the effect of limiting a section of the wide-angle field of view of two adjacent real cameras by means of parameters chosen by the user for the virtual camera for constructing a sub-image of a panoramic scene.
Figure 1F:
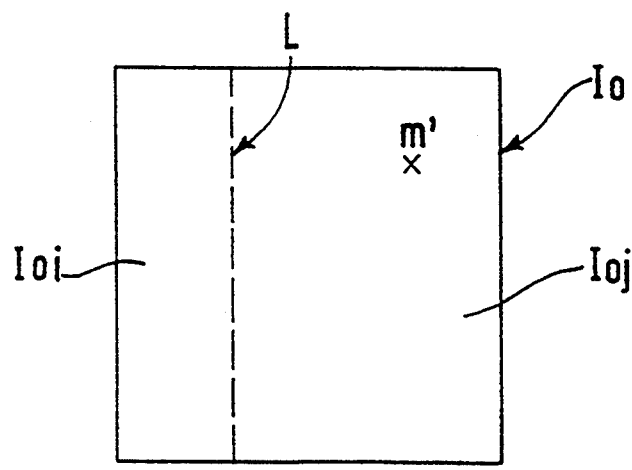
FIG. 1F shows the target image constructed by the virtual camera defined by these parameters, this target image being composed of a first part of an image constructed on the basis of the source image furnished by the first of the two real cameras and of a second image part constructed on the basis of the source image furnished by the second of these cameras.
Figure 1G:
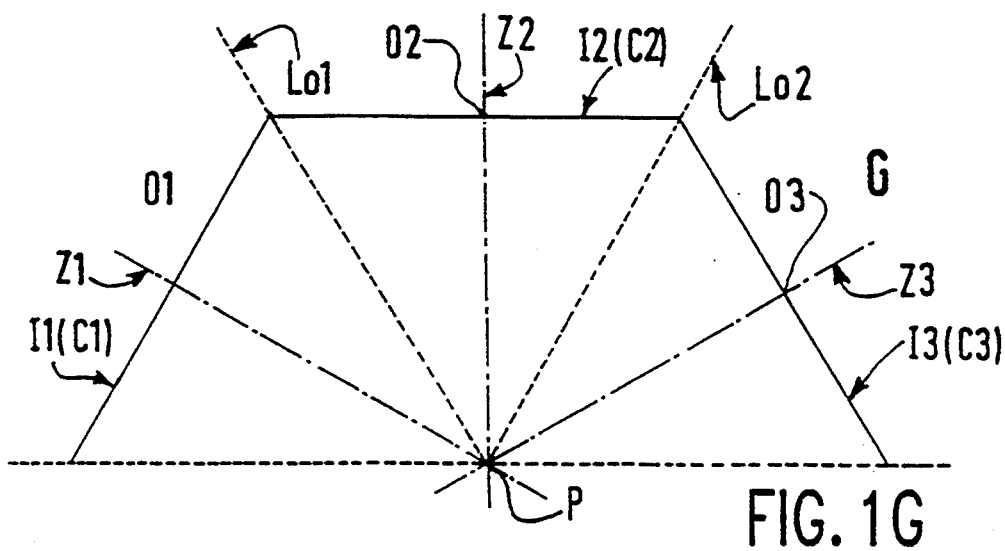
FIG. 1G shows an arrangement of three adjacent real cameras for covering a field of view of 180°.

FIG. 1G shows a possible arrangement of several real fixed cameras for recording the data relating to a scene through an angle of 180°. This panoramic scene is recorded with three fixed cameras C1, C2, C3. The cameras have such optical fields that, absolutely, all the details of the panoramic scene are recorded by the one or the other camera so that no object under surveillance is left out. The cameras are arranged to have a common view point P or very close view points.

The axes PZ1, PZ2, PZ3 represent the optical axes of the cameras C1, C2, C3, respectively, and the points 01, 02, 03 represent the geometrical centers of the images I1, I2, I3, respectively, in the image planes on the optical axes.

A horizontal surveillance through 360° can be carried out by suitably arranging 6 fixed cameras. However, a vertical surveillance or a surveillance in both directions may also be carried out. Those skilled in the art will be able to realize any type of system for observation of a panoramic scene so that a more detailed description of the various mutual arrangements of the fixed cameras is not necessary.

With reference to FIG. 1A, the image pick-up device comprises a plurality of n fixed real cameras having known and fixed focal lengths and being arranged adjacent one another so that their individual fields of view merge to cover a wide-angle field of view. The n adjacent fixed cameras furnish n adjacent fixed images so that this image pick-up device can monitor a panoramic scene. The cameras have such optical fields that all the details of the panoramic scene are recorded by the one or the other camera so that no object under surveillance is left out.

To obtain this result, these n adjacent fixed cameras are also arranged in such a way that their optical centers P, referred to as view points coincide. The view point of a camera is defined as the point at which each ray emitted from a luminous source and passing through this point traverses the optical system of the camera without any deviation.

The view points of the n cameras need not coincide physically. However, it will hereinafter be assumed that the condition of coincidence is fulfilled sufficiently if the distance separating each of these view points is small as regards their distance to the filmed panoramic scene, for example, if their respective distance is 5 cm or 10 cm and the distance to the panoramic scene is 5 m. The condition of coincidence is thus estimated to be fulfilled if the ratio between these distances is of the order of or is more than 50 and, according to the invention, it is not necessary to use costly optical mirror systems which are difficult to adjust for achieving a strict coincidence of the view points.

II/Formation of the images by the cameras.

It is an object of the invention to provide a system for reconstructing a digital image which simulates a mobile camera which, with the settings selected by a user, is capable of furnishing a digital image of any part, or sub-image, of the panoramic scene recorded by the n fixed cameras.

The n cameras are numbered $C1, \ldots, C_i, C_j, \ldots, C_n$ supplying digital source images $I1, \ldots, I_i, I_j, \ldots, I_n$, respectively. For example, the source images $I_i$ and $I_j$ formed by two adjacent fixed real cameras $C_i$ and $C_j$ will be considered hereinafter.

These fixed real cameras $C_i$ and $C_j$ form respective images of the panoramic scene in adjacent source image planes $I_i$ and $I_j$. In FIG. 1A the axes $P_{zi}$ and $P_{zj}$ passing through the geometrical centers $O_i$ and $O_j$ of the source images $I_i$ and $I_j$, respectively, represent the optical axes of the fixed real cameras $C_i$ and $C_j$.

With reference to FIG. 1B, a landmark $P_x$, $P_y$, $P_z$ of orthogonal axes is defined in which the axes $P_x$ and $P_z$ are horizontal and the axis $P_y$ is vertical.

The source images, such as the images $I_i$ and $I_j$, are numbered and each pixel m of these images is marked by way of its coordinates in the image plane. As is shown in FIG. 1C, a mark of rectangular coordinates $(O_iX_i, O_iY_i)$ and $(O_jX_j, O_jY_j)$ are defined in each image plane in which the axes $O_iX_i$, or $O_jX_j$ are horizontal, i.e., in the plane of the landmark $P_x$, $P_z$. The image planes defined by $(O_iX_i, O_iY_i)$ and $(O_jX_j, O_jY_j)$ are perpendicular to the optical axes $P_{zi}$ and $P_{zj}$ and have respective geometrical centers $O_i$ and $O_j$.

Once these individual marks relating to each image plane of the cameras are established, these fixed source image planes may be related to the landmark by means of:

their azimuth angle (or pan angle) $\Theta_i$, $\Theta_j$,
their angle of sight (or tilt angle) $\phi_i$, $\phi_j$.

The azimuth angle $\Theta_i$ or $\Theta_j$ is the angle forming a vertical plane containing the optical axis $PZ_i$ or $PZ_j$ with the horizontal axis $P_z$ of the landmark. Thus, this is a horizontal angle of rotation about the vertical axis $P_y$.

The angle of sight $\phi_i$ or $\phi_j$ is the angle formed by the optical axis $PZ_i$ $PZ_j$ with the horizontal plane ($P_x$, $P_z$). Thus, this is a vertical angle of rotation about a horizontal axis, the axis $O_iX_i$ or $O_jX_j$ of each image plane.

For reasons of simplicity, it has hereinafter been assumed, by way of example with reference to FIG. 1A, that the source image planes $I_i$, $I_j$ furnished by the fixed cameras $C_i$, $C_j$ are vertical, i.e. their angles of sight $\phi_i$, $\phi_j$ are zero.

For similar reasons of simplicity, the same reference in FIG. 1A denotes the trace of the planes and the axes and the corresponding planes and axes for both the source images and for the target image described hereinafter.

FIG. 1A, which is a diagrammatic plan view of the images formed, thus only shows the traces $I_i$ and $I_j$ of the fixed source image planes represented by segments in the horizontal plane $P_x$, $P_z$.

FIG. 1E shows, for example, the contiguous images $I_i$ and $I_j$ of the panoramic scene, furnished by two adjacent fixed cameras $C_i$ and $C_j$. In FIG. 1E, both images $I_i$ and $I_j$ are projected in the same plane for the purpose of simplicity, whereas in reality these images constitute an angle between them which is equal to that of the optical axes of the fixed cameras. In these images, the user may choose to observe any sub-image bounded by the line $J_o$ more or less to the left or to the right, more or less to the top or to the bottom with the same magnification as the fixed cameras or with a larger magnification, or possibly with a smaller magnification.

The simulated mobile camera is capable of constructing a target image $I_o$ from parts of the source image $S_i$, $S_j$ bounded by the line $J_o$ in FIG. 1E. This camera, denoted by $C_o$ hereinafter, is referred to as the virtual camera because it simulates a camera which does not really exist. Evidently, this simulated mobile camera is not limited to scanning the two images $I_i$, $I_j$. It may scan all the source images from $I1$ to $I_n$.

This virtual camera $C_o$ can be defined in the same manner as the fixed real camera by means of:

its azimuth angle $\Theta_o$
its angle of sight $\phi_o$
its angle of rotation $\psi_o$
and its magnification (zoom effect) defined by its focal length $PO_o$, and denoted as $z_o$, with its view point P being common with the view points P of the fixed real cameras, while $O_o$ is the geometrical center of the target image $I_o$. The view point of the virtual camera is common with the approximate view point as defined above for the real cameras.

FIG. 1A shows the trace denoted by $I_o$ of the image plane of the virtual camera in the horizontal plane and its optical axis $PZ_o$ passing through the geometrical centre $O_o$ of the target image $I_o$.

In the definition of this mobile virtual camera $C_o$, the azimuth angle $\theta_o$ is the angle made by the vertical plane containing its optical axis $PZ_o$ with the horizontal axis $P_z$ of the landmark; the angle of sight $\phi_o$ is the angle made by its optical axis $PZ_o$ with the horizontal plane $P_x$, $P_z$ of the landmark; its angle $\psi_o$ is the angle of rotation of the virtual camera about its own optical axis, the latter being fixed; and finally, its focal length $PO_o$ is variable so that the magnification of this target image with respect to that of the source images can be changed (zoom effect).

By varying the azimuth angle $\Theta_o$ and the angle of sight $\phi_o$, the angle of rotation $\psi_o$ and the focal length $PO_o$, the virtual camera is entirely similar to a mobile camera which scans the wide-angle field of view formed by the merged fields of view of the different fixed real cameras $C1$ to $C_n$.

It is to be noted that the virtual camera $C_o$ can view a small part (or subsection) bounded by $J_o$ of the wide-angle field of view and by realizing a magnified image $I_o$, for example, of the same final dimension as each of the images $I1, \ldots, I_n$ furnished by each real camera $C1, \ldots, C_n$ by varying its variable focal length $PO_o$.

It is also to be noted that the displacement of the field of view of the virtual camera $C_o$ may be continuous and arbitrary; this field of view corresponding to Jo may be on or at both sides of the two parts (Si, Sj) of the contiguous images Ii and Ij at LO, furnished by two adjacent cameras Ci and Cj.

In this case, the image Io constructed by the virtual camera Co contains two different image parts, one part Ioi being constructed on the basis of information Si in the digital image Ii and the other part Ioj being constructed on the basis of information Sj in the digital image Ij. In FIG. 1A, Ioi and Ioj represent the traces of the target images Ioi and Ioj in the horizontal plane.

Likewise as for the real images, a mark of rectangular coordinates (Oo Xo, Oo Yo) will now be defined with reference to FIG. 1D in the digital target image plane Io, in which mark the axis Oo Xo is horizontal, i.e. in the horizontal plane of the landmark Px, Pz. The pixel Oo is the geometrical, center of the target image Io and is also situated on the optical axis PZo of the virtual camera Co. Each pixel m' of the target image plane Io is thus marked by its coordinates in this system of rectangular axes (Oo Xo, Oo Yo).

A framework of the target image is also defined, i.e., its dimensions in numbers of pixels in the horizontal direction and in numbers of lines in the vertical direction.

III/The method of constructing the target image from source images.

The digital image processing means according to the invention are used for constructing the "target image" furnished by the virtual camera from "source images" furnished by the fixed real cameras.

Figure 7A:
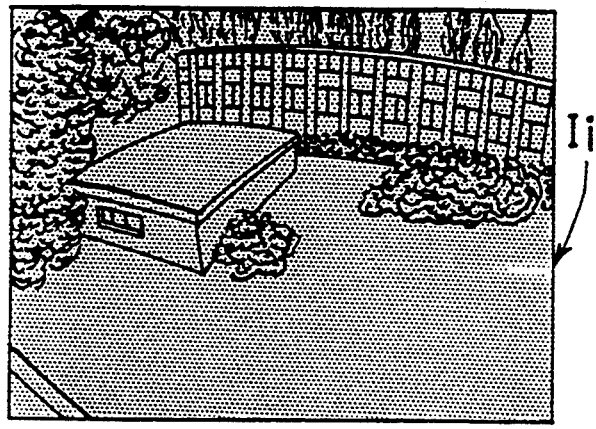
FIG. 7A shows a first digital source image formed by a first real fixed camera and FIG. 7B shows a second source image formed by a second real fixed camera adjacent to the first camera.
Figure 7B:
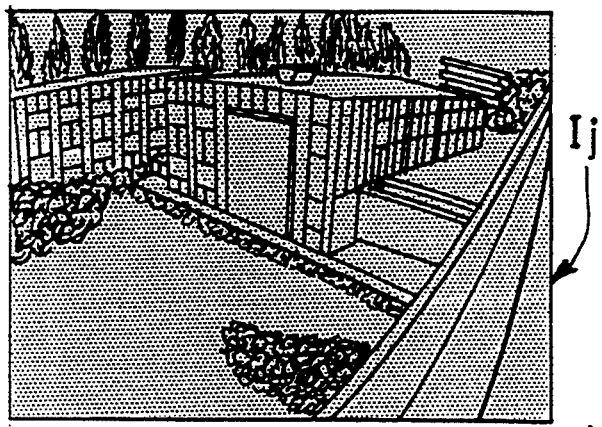

As stated hereinbefore, a technical problem may occur in the construction of the target image Io because the images Ii and Ij furnished by the adjacent real cameras and represented in the form of digital landscape images in FIGS. 7A and 7B show distortions which do not correctly blend: particularly certain parts of the straight lines are curved, while the vertical lines are not vertical, etc. As a result, when they are joined, these lines may be cut instead of being in alignment. Moreover, the parts of the source images at both sides of the joint originate from panoramic scene parts which are viewed under different perspectives. The result is that the parts of the target images Ioi and Ioj are poorly joined, as is apparent in the digital target image shown by way of example in FIG. 7C and formed by the simple juxtaposition of the parts of the digital images shown in FIGS. 7A and 7B.

The present invention proposes a method and means for eliminating these faults and provides a reconstructed digital image which does not have distortion and perspective faults and whose parts Ioi, Ioj from which it is composed are joined in such a manner that the straight boundary is invisible to the observer and the user.

Figure 7C:
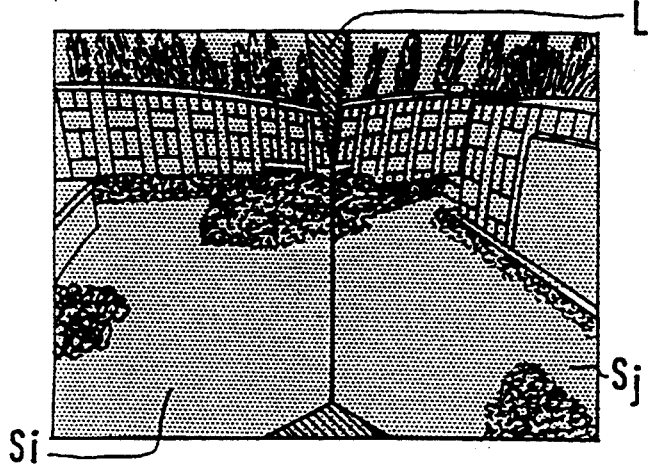
FIG. 7C shows a digital target image reconstructed in the same manner as in the case of FIG. 1F showing the distortion and perspective faults between the first target image part constructed on the basis of the first source image and the second target image part constructed on the basis of the second source image.
Figure 7D:
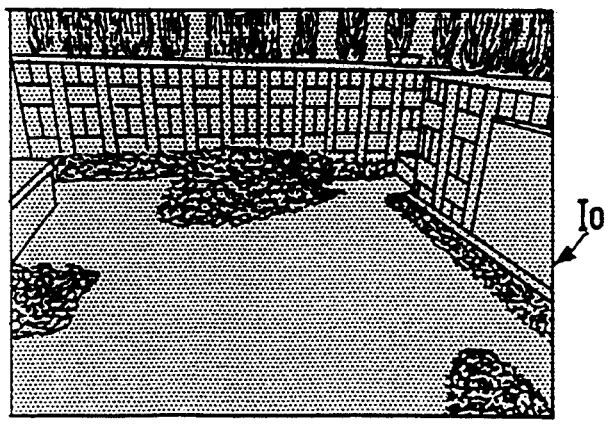
FIG. 7D shows the digital target image of FIG. 7C after treatment by the image processing device, in which the distortion and perspective faults have been eliminated.

FIGS. 7D shows the digital landscape image of FIG. 7C in which the distortion and perspective faults have been corrected by the means according to the invention.

The general method of constructing the source image comprises different steps which are carried out by the signal processing device described hereinafter.

This method first comprises a step in which:
a point m at an address Aq in a source image is made to correspond to each pixel m' having an address Ao in the target image Io, which address is defined by:
the reference or index of the real camera furnishing the source image;
the address Aq of the point m in this source image.

This method comprises a second step in which:
the most probable luminance value is evaluated at said point m in the source image,
subsequently this luminance value is assigned to the pixel m' in the target image.

These steps are carried out for all the pixels m' in the target image Io.

The processing means may give the constructed target image all the qualities of an image obtained by an observer using a conventional mobile camera:
absence of distortions, adjustment of perspectives,
absence of straight interrupting lines at the boundary between two or more adjacent images.

The problem thus is to render these straight boundaries invisible.

IV/Essential elements of the image processing device.

Figure 2:
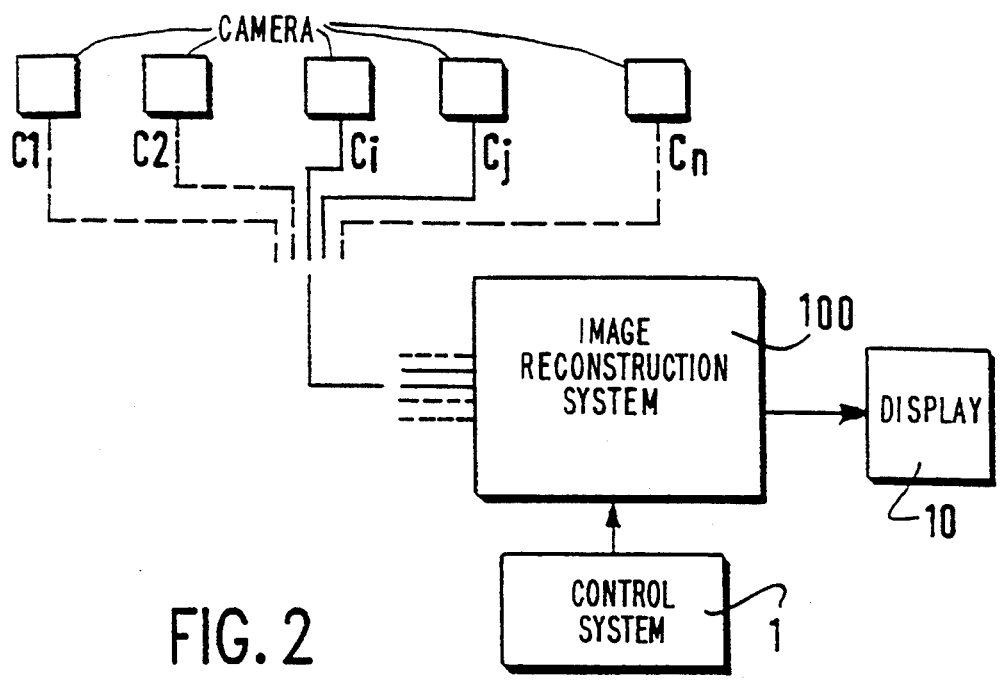
FIG. 2 shows, in the form of functional blocks, the image processing device with the system for constructing the target image, the real cameras, the user interface and the system for displaying the target image.

FIG. 2 shows the different elements of the image processing device according to the invention in the form of functional blocks.

The blocks C 1, Ci, Cj, ..., Cn represent the n fixed real cameras whose outputs supply the n source images denoted by I1, ..., Ii, Ij, ..., In.

Each real camera has pick-up parameters corresponding to its orientation with respect to the scene, as well as a scale factor. These parameters should be precisely known.

The block 1 shows a control system which enables the user to choose and display parameters relative to the orientation and to a scale factor of the virtual camera Co.

The block 100 is an image reconstruction system which allows computation, on the basis of source images I1, ..., In, which are provided by the real cameras C1, ..., Cn, of the image referred to as "target image" Io given by the virtual camera Co which is oriented and adjusted by means of the parameters defined by the control system 1, which virtual camera Co is arranged in such a way that its view point is common with or close to the view point P of the real cameras.

The block 10 corresponds to display means, or recording means which may be, inter alia a digital television monitor for real time display and/or a video recorder for recording on video tapes, etc.

It is to be noted that the real cameras may furnish analog data. In this case A/D conversion modules (not shown) are used for forming the digital source images.

Advantageously, those skilled in the art may choose CCD cameras (Charge-Coupled Device). This type of camera is easy to handle, lightweight, robust and reliable. It has a very good resolution and, in turns of technical evolution, it may further be improved in the future.

V/Detailed elements of the image processing device.

Figure 3:
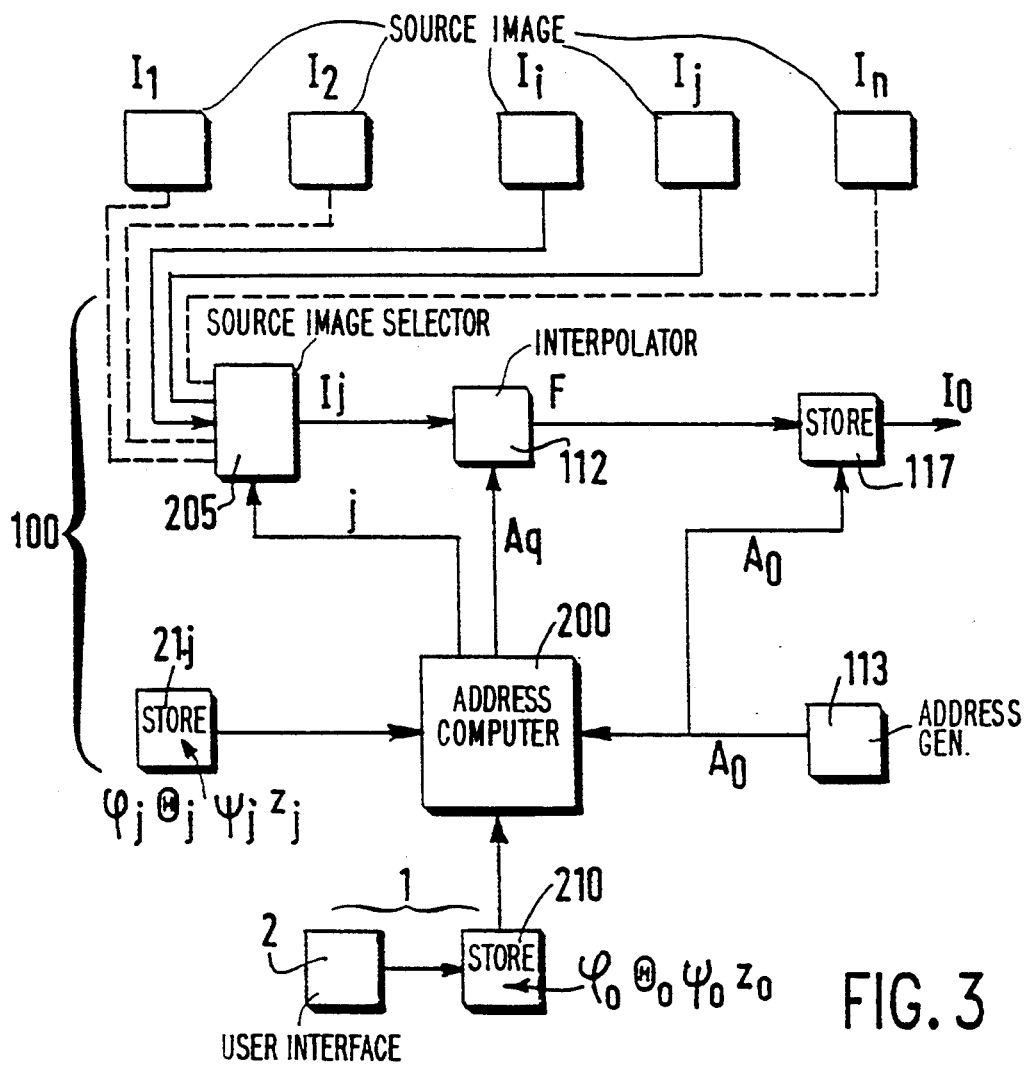
FIG. 3 shows the image processing device in the form of functional blocks in greater detail than in FIG. 2.

FIG. 3 shows a diagram of functional blocks corresponding to the essential means for realizing the processing operation.

These means principally comprise:
a user interface 2,
an address computer 200 including a source image selector 205;
an interpolator 112,
an address generator 113 which, pixel by pixel, generates the addresses Ao of the pixels of the target image Io so as to cover the entire target image Io,
first means 210 for storing the parameters $\phi_{so}$, $\Theta_o$, $\psi_o$ and $z_o$ (the scale factor) of the virtual camera Co, second means 21.1 to 21.n for storing the parameters $\phi 1$ to $\phi n$, $\Theta 1$ to $\Theta n$, $\psi n$ to $\psi n$ and z1 to zn (the scale factors of the real cameras C1 to Cn), respectively, third storage means 117.

For each pixel m' of the target image Io to be constructed, an address Ao is stored in the block 113 for generating the addresses in the target image Io. As a function of the settings chosen by the user, which settings are entered into the control block 1 by means of a user-interface 2 and which are stored in the form of parameters $\phi o$, $\Theta o$, $\psi o$ and zo of the virtual camera in the block 210, and as a function of the parameters $\phi i$, $\Theta i$, $\psi i$ and zj (j representing the index of all the cameras from 1 to n) of the real cameras which are stored in the blocks 21.1, 21.j, 21.n, the address computer 200 applies the index j (among all the indices 1 to n) of the real camera Cj which is capable of supplying the image Ij with the corresponding data to the address Ao of the pixel m' of the target image Io.

Subsequently, the image selector 205 selects this real camera Cj among the n real cameras and provides the corresponding source image Ij in which these data to be processed are found.

On the basis of the same elements, the address computer 200 computes the corresponding address Aq of the point m in this selected source image Ij, and this via different perspective transforms performed by the user at the interface 2.

Conformity between a pixel m' at a given address Ao of the target image Io and a point m at a computed address Aq of a source image Ii is thus established.

Subsequently, the luminance value at the point m at the address Aq in the source image Ij is determined in order to be assigned to the corresponding pixel m' at the address Ao in the target image Io. This is repeated for all the pixels of the target image Io.

Whereas the address Ao in the target image Io is really that of a pixel m', the address Aq in the source image Ii is exactly a computed address so that, generally, this address found does not coincide with a pixel, but with a point m between the pixels. The luminance of this point m should thus also be computed.

Figure 4:
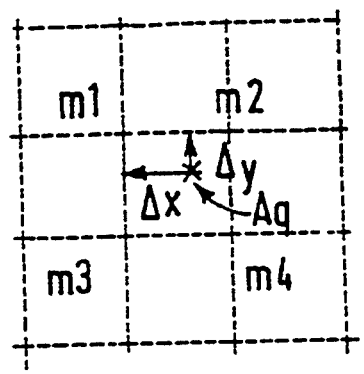
FIG. 4 illustrates the computation of a value of a luminance function relative to an address in a source image.

FIG. 4 illustrates the problem which occurs when the address Aq does not coincide with any pixel of a source image Ii.

This problem is dealt with by the interpolator 112.

The interpolator 112 takes the light intensity into account, i.e., for example, the grey levels or a value of the luminance function of the pixels proximate to the address Aq for computing the light intensity to be assigned to the address Aq in question. By way of interpolation, the block 112 computes the intensity which is most likely to be assigned to the address Aq.

There are several possible interpolation functions which are more or less complex and which, in accordance with their complexity, yield more or less finely adjusted results.

A very simple interpolation function is the bilinear interpolation illustrated in FIG. 4. The address Aq comprises a whole part and a fractional part. For this reason, the address Aq is situated between four neighbouring pixels m1, m2, m3, m4. The fractional part of the address is represented by $\alpha x$ positively counted from m1 to m2 and by $\alpha y$ positively counted from m1 to m3. The distance between m1 and m3 and between m1 and m2 is 1 pixel.

The intensity F or the value of the luminance function at the address Aq is computed on the basis of the values of $\Delta x$, $\Delta y$ and the intensities (or values of the luminance functions) of the neighboring pixels m1, m2, m3, m4, being F1, F2, F3, F4, respectively, $$F(Aj)=F1(1-\Delta x)(1-\Delta y)+F2\Delta x(1--\Delta y)+F3(1-\Delta x)\Delta y+F4\Delta x.\Delta y$$

The intensity F(aq) computed by the interpolator at the address Aq in the source images is subsequently attributed as the intensity (or value of the luminance function) to the pixel m' situated at the initial address Ao in the target image Io and stored in the block 117.

VI/Description of the address computer 200

The address computer 200 will hereinafter be described in detail with reference to FIG. 6.

The address computer 200 first takes the parameters of the virtual and real cameras as defined hereinbefore into account.

The parameters $\phi o$, $\Theta o$, $\psi o$ and zo of the virtual camera are available in the storage module 210; the parameters $\phi 1$ to $\phi n$, $\Theta 1$ to $\Theta n$, $\psi 1$ to $\psi n$ and z1 to zn of the real cameras are available in the storage modules 21.1 to 21.n, respectively.

A definition of the dimensions of the images in numbers of pixels expressed by width $\times$ height (in pixels) has been determined. The scale factors zo or zi are expressed in pixels/millimeter. The angles are expressed, for example in degrees.

For the virtual camera, these parameters $\phi o$, $\Theta o$, $\psi o$, zo are computed on the basis of the orientation or positioning of the optical axis of the virtual camera, the positioning of its view point P and the image center Oo and on the basis of the scale factor, which values are chosen by the user and entered at the interface 2.

For the real cameras, the parameters $\phi 1$ to $\phi n$, $\Theta 1$ to $\Theta n$, $\psi 1$ to $\psi n$ the focal lengths PO1 to POn, the scale factors z1 to zn and the centers O1 to On of the digital image are determined in a very precise manner on the basis of very accurate calibrations and measurements of the position of the point P and the centers O1 to On of each camera, its scale factor and the orientation or positioning of its optical axis.

The address computer 200 also comprises means 201 and 206 for constructing a model of the virtual camera Co and a model of the real cameras C1, C2, ..., C3, ..., Cn.

Figure 5A:
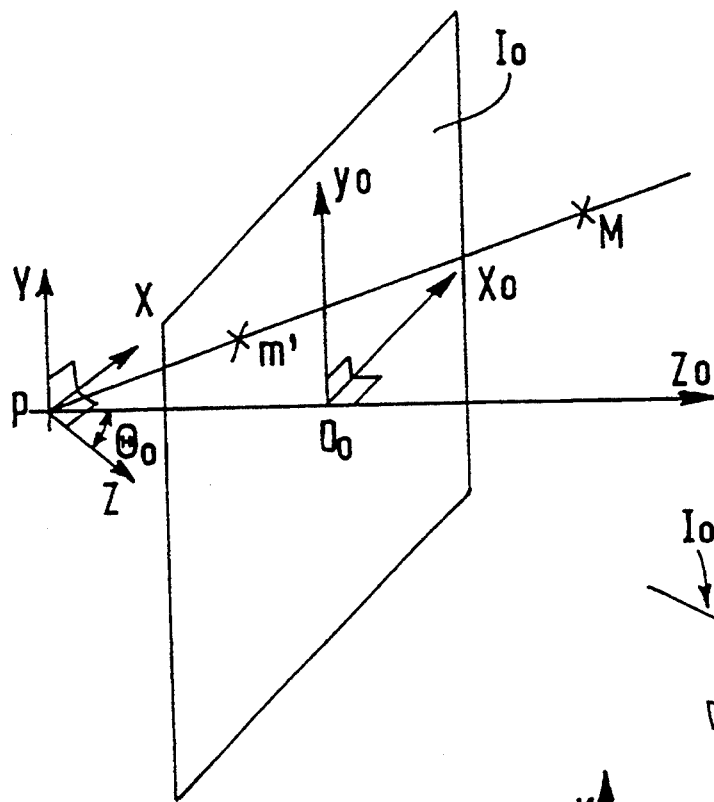
FIG. 5A illustrates the models of the real and virtual cameras.

FIG. 5A illustrates the principle of forming a model for the virtual camera Co and the real cameras C1, C2, ..., Cn. The projection model shown in FIG. 5A is based on a conical projection through a point in accordance with which all the optical rays pass through the single view point P (the pin-hole model). The view point P is supposed to be common for all the real cameras or the virtual camera under the conditions as stated hereinbefore.

The landmark Px, Py, Pz and the individual mark of the virtual camera are defined in the construction module 201; the landmark Px, Py, Pz and the individual marks of each of the real cameras C1 to Cn are defined in the construction module 206.

Let it be assumed, with reference to FIG. 5A, that M is an object point situated in a scene to be monitored. The point m', corresponding to M in the image plane of the virtual camera Co, is situated at the intersection between the straight line PM and the image plane Io (Ooxo, Ooyo) of the camera Co.

It is to be noted that the model of FIG. 5A is directly valid for the virtual camera which is an ideal camera without distortions. As a real camera is used which is provided, for example with a wide-angle aperture objective, there are distortions in the image which must be corrected.

Figure 5B:
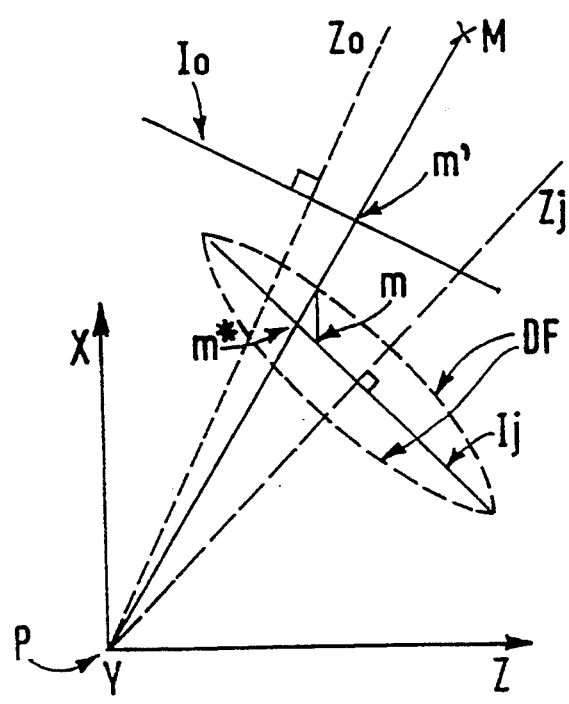
FIG. 5B illustrates, in projection on the horizontal plane of the landmark, the perspective and distortion effects on the positions of the corresponding points having the same luminance in the target image and in the source image traversed by the same light ray passing through these points.

FIG. 5B illustrates this problem. This FIG. 5B shows the traces of the planes of the target image Io and the source image Ij shown similarly as in FIG. 1A.

The problem to be solved for constructing the target image Io on the basis of source images I1 to In is to determine at which address Aq the point m which corresponds exactly to the pixel m' of the address Ao can be found. In fact, it is attempted to determine the intensity which exists in the source image at this point m so as to be able to assign it to the pixel m' in the target image.

This determination is not simple because the distortion and perspective faults influence the real cameras.

Similarly as in FIG. 5A, FIG. 5B shows that the pixel m' of the address Ao is present at the intersection between the light ray PM and the target image Io, PM being the ray which joins the view point P with a point M of the scene to be observed because in this ideal camera each ray passing through the view point P traverses the image plane without any deviation.

This ray PM intersects the plane of the source image Ij at a point m'. The camera Cj will thus be the real camera selected to provide the data which are necessary for constructing this part of the target image.

However, on the other hand, it is not true that the point m' at the intersection between the same ray PM and the plane of the source image Ij is the point corresponding to m' in Ij which is capable of supplying the intensity value of F to be assigned to this point m'.

The fact should be taken into account that the camera Cj, as every camera, has an optical objective which forms a real image on a substrate provided with a CCD matrix; this real image is subsequently transformed by an A/D conversion module for supplying the digital source image Ij which is then processed by the digital image processing device according to the invention. Due to the fact that it is necessary to use a system of objective lenses, it may be considered, as shown diagrammatically in FIG. 5B, that the light ray MP is deviated by the distortion field DF shown in broken lines, with the result that the point corresponding to m' is not the point m* situated on MP but a point m situated at a small distance from m* in the plane of the source image Ij.

With the data relating to the landmark and the individual marks, the construction module 201 builds a model MCo of the virtual camera on the conical projection model represented in FIG. 5A in which each ray PM in the three-dimensional space corresponds to a pixel m' in the two-dimensional space constituted by the plane of the target image Io, because the virtual camera Co is considered to be an ideal camera.

On the other hand, with the data relating to the landmark and to the individual marks, the construction module 206 builds the models MC1 to MCn relating to each real camera on the conical projection model represented in FIG. 5A in which each ray PM in the three-dimensional space corresponds to a point m* in the two-dimensional space constituted by the source image plane of each camera. As these cameras are not ideal cameras but, in contrast, present distortions, this construction module 206 for the models MC1 to MCn comprises means for correcting distortions, with which means the point m* corresponding to a distorted source image can be systematically replaced by a point m in the same two-dimensional space, which point corresponds to a corrected source image. All the means for correcting the distortions of the objectives may be known to those skilled in the art.

The address computer 200 also comprises address computing means for determining the address Aq of this point m of the distorted source image Ij.

These means are shown in the form of functional blocks in FIG. 6 and implement a method of computing the address Aq, described hereinafter and illustrated in FIG. 5B for the sake of clarity.

VI.a/The method of computing the address.

This method of computing the address Aq corresponding to an initial address Ao comprises several steps including at least a complex geometrical transform which is the product of several elementary transforms. This geometrical transform is based on the fact that, thanks to the module 206 described hereinbefore, there is now uniformity between each pixel m in a source image of a real camera and a light ray PM in the three-dimensional space passing through the view point P which is defined for the model of the camera. The localization of a pixel m in the image depends on the camera parameters relating to the definition of the model of this camera, while the corresponding light ray PM has a localization in the three-dimensional space which may be expressed with respect to the fixed landmark.

The method of computing the address Aq on the basis of Ao includes the following steps:

a first transform referred to as "inverse perspective transform" denoted $H_o^{-1}$ which indicates the direction of the light ray PM corresponding to the initial address Ao in the target image Io, searching the index j of the real camera Cj whose field of view comprises the light ray in question, and if several cameras are concerned, choosing an appropriate camera for a possible overlap of the fields of view, a second transform referred to as "direct perspective transform" denoted Hj which provides the address Aq in the image Ij of the selected real camera Cj, corresponding to the light ray PM.

The two transforms, i.e. the inverse transform $H^{-1}$ and the direct transform H thus depend on the definition of the models of the cameras having a view point P of the pin-hole model.

For realizing the complex geometrical transform H, an operation referred to as "perspective projection" J is first considered, which operation enables the user to pass from the point M of a scene, which is marked in the landmark (Px, Py, Pz), to the point m positioned in the image plane of a real camera Ci, the point m thus being marked in the individual orthonormal system related to this real camera, i.e. (Ojxj, Ojyj, Ojzj).

With the "perspective projection" operation J, the marking of a point in a three-dimensional system is changed to a marking in a two-dimensional system by means of a mathematical method. This operation may be linearized by using the homogeneous coordinates with which the transform by a 4×4 matrix can be expressed.

The geometrical transform H referred to as "perspective transform" is the product of several matrices with homogeneous coordinates:

T is a matrix representing a translation,

S is a matrix representing a change of the scale,

J is the "perspective projection" matrix referred to hereinbefore,

L is a change of origin,

R is a rotation in accordance with the angles $\phi j$, $\Theta j$, $\psi j$, or $\phi o$, $\Theta o$, $\psi o$, as the case may be.

The direct geometrical transform is thus expressed by:

$$H = T * S * J * L * R$$

and the inverse geometrical transform is expressed by:

$$H^{-1} = T^{-1} * S^{-1} * J^{-1} * L^{-1} * R^{-1}.$$

This transform may be expressed in an approximate manner for an assembly of polynomial functions by using, for example the least-squares method.

The approximate transform thus obtained may then be realized by means of a commercially available product referenced TMC2302 of the firm of TRW. The address of this firm is: PO Box 2472, La Jolla, Calif. 92038 (US).

VI.b/Description of a particular implementation Of the address computer 200

Figure 6:
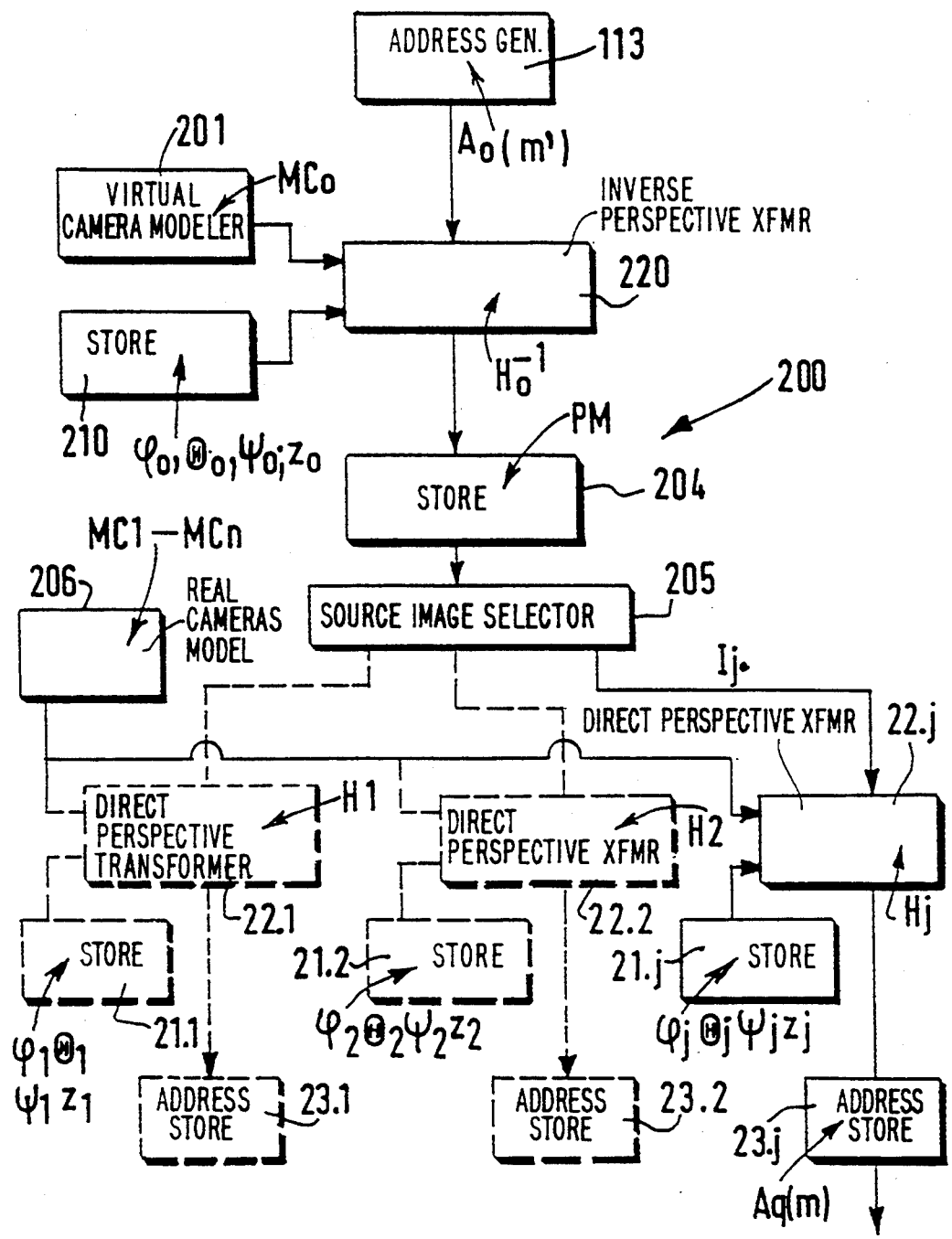
FIG. 6 shows, in the form of functional blocks, the address computer which computes the address of the point in the source image corresponding to a pixel at an address in the target image.

This implementation is illustrated by means of functional blocks in FIG. 6, showing:

the block 201 which is the first construction module for the model of the virtual camera MCo, the block 210 which is the first module for storing the parameters $\phi o$, $\Theta o$, $\psi o$, zo of the virtual camera as effected by the user at the interface 2 of the control block 1, the block 113 which is the generator for the addresses Ao of all the pixels m' of the target image Io, the block 220 which is a first module for computing the geometrical transform which receives the following information:

the address Ao of m' from the address generator 113, the model MCo of the virtual camera from the construction module 201, the parameters $\phi o$, $\Theta o$, $\psi o$, zo of the virtual camera from the first storage module 210.

In the three-dimensional space the computation block 220 determines the position of the ray PM passing through the view point (P) and through the pixel m', based on the localization of m' in the two-dimensional space Io. To this end, this computation block 220 applies the inverse perspective transform $H_o^{-1}$ as described hereinbefore, the block 204 which is a module for storing the position of the light ray PM in the three-dimensional space, which position is provided by the computation block 220, the selection block 205 which is a switching module and which, based on the localized ray PM, selects the real camera Cj and provides the corresponding source image Ij in which the searched point m is present, the block 206 which is the second module for constructing the models MC1 to MCn of the real cameras with means for correcting the distortions being incorporated, the blocks 21.1 to 21.n which are the storage blocks referred to as second means for storing the parameters $\phi 1$ to $\phi n$, $\Theta 1$ to $\Theta n$, $\psi 1$ to $\psi n$, z1 to zn, respectively, of the real cameras, the blocks 22.1 to 22.n which are said second modules for computing the geometrical transform and which receive the following information, the selection signal from the switching module 205 with the information relative to the source image Ij in the case described by way of example where camera Cj has been selected, the model MCj of the real camera Cj from the second construction module 206, the parameters $\phi j$, $\Theta j$, $\psi j$, zj of the real camera Cj from the storage module 21.j (second storage means) in the case described. In the present case the computation module 22.j (second means for computing the geometrical transform) computes the localization of the point m in the two-dimensionsl space constituted by the plane of the source image Ij, on the basis of the localization provided by the module 204 for storing the light ray PM, and this by means of the direct perspective transform Hj described hereinbefore, the blocks 23.1 to 23.n which are blocks for storing the addresses Aq of each point m. In the present case the address Aq of the point m searched will be available in the storage module 23.j.

If the switching module 205 had selected another source image, another computation module 22.1 to 22.n would have applied the appropriate direct perspective transform H1 to Hn for localizing the point m in this other source image.

With reference to these operations effected in the address computer 200, with reference to FIG. 3, this address computer 200 applies the address Aq to the interpolator block 112 and the latter computes the corresponding luminance function F. The image Io may thus be reconstituted in the storage block 117 by causing a value of the luminance function F to correspond to each pixel m of the address Ao. The target image is now reconstructed.

With reference to FIG. 2, the image Io may subsequently be displayed, or stored in the means 10.

If several source images are possible, for example, because the source images overlap each other in a boundary region, the selection block 205 contains means for choosing a single one of the two source images.

A method of selecting one of the two images is to decide whether the seam between two images in the boundary region is constituted by a straight line which substantially passes through the middle of the overlap zone. This method is applicable to cameras which are juxtaposed horizontally, as in FIG. 1, with vertical seams.

Those skilled in the art will be able to choose all kinds of seams, for example, seams which are arranged radially on conics.

It is to be noted that what has been stated for coding the pixels at a grey level may also apply to coding a color image. The coding is simply effected for a larger number of bits.

In order that no seam is noticeable in the target image, it should be noted that it is necessary to take several measures:

precise calibration of the fixed cameras, correction of the results by applying feedback, followed by a possible modification of the parameters of the fixed camera models until a perfect juxtaposition contributing to a target image without any faults is obtained.

This operation, or initialization, should be an integral part of the calibrating operation.

It is also to be noted that distortion corrections are to be performed on each source image for the construction of the models MC1 to MCn. Devices capable of realizing these operations are commercially available. Verification of the perfect operation of the distortion correcters used is also an integral part of the calibration.

The different real cameras may have different color or grey level intensity response curves. During calibration, it is necessary to perform a correction of these individual responses so as to obtain a uniform virtual image.

The user interface 2 may be controlled automatically or manually. In one implementation, this interface may be a joystick.

We claim:

1. A method of processing images for constructing a target image (Io) from adjacent images having a fixed frame line and referred to as source images (I1, ..., Ii, Ij, ..., In), said source and target images having substantially common view points, characterized in that the method comprises the steps of:

(a) digitizing said source and target images;
    (b) determining a substantially common view point (P) to said source and target images, and a fixed orthonormal landmark (Px, Py, Pz) originated at said common view point (P);
    (c) generating, pixel by pixel, an address, for each pixel, in the target image (Io), so as to entirely cover said target image (Io);
    (d) calculating, on the basis of an address (Ao) of a current pixel referred to as an initial pixel (m') in the target image (Io), an orientation, in said fixed landmark, of a straight light ray (PM) passing through said initial pixel (m') and through said common view point;
    (e) selecting a source image (Ij) traversed by said straight light ray (PM);
    (f) calculating, from said orientation of the straight light ray (PM), an address (Aq) of a distortion corrected point (m), in said selected source image (Ij), said distortion corrected point (m) corresponding to said initial pixel (m');
    (g) calculating a luminance value (F) at said distortion correct point m in said source image Ij;
    (h) assigning the luminance value (F) of said distortion corrected point (m) to the initial pixel (m') in the target image (Io);
    (i) repeating steps (d)–(h) for each pixel of the target image (Io), until all pixels of the target image (Io) have been processed.

2. A method as claimed in claim 1, characterized in that said method comprises calibration steps including:

storing parameters of the source images, including scale factors (z1, ..., zn) and orientation angles constituted by azimuth angles ($\Theta 1, ..., \Theta n$), angles of sight ($\phi 1, ..., \phi n$) and angles of rotation ($\psi 1, ..., \psi n$) of source images optical axis, said angles being defined in said fixed orthonormal landmark (Px, Py, Pz);
    constructing real camera models for providing said source images with said view point which is substantially common with the origin of said landmark, and for correcting aberrations in said source images;
    storing target image parameters, including scale factor (zo) and orientation angles constituted by an azimuth angle ($\Theta o$), an angle of sight ($\phi o$) and an angle of rotation ($\psi o$) of the target image optical axis, said angles being defined in said fixed orthonormal landmark (Px, Py, Pz); and
    constructing a virtual camera model for providing said target image with said view point which is substantially common with that of the source images.

3. A method as claimed in claim 2, characterized in that the step of determining the position of the straight light ray (PM) in said landmark comprises a geometrical transform referred to as "inverse perspective transform" ($Ho^{-1}$) which takes the virtual camera model into account;
    the step of determining the address (Aq) of said distortion corrected point (m) corresponding to said initial pixel (m') comprises perspective geometrical transforms (H1–Hn) referred to as "direct perspective transforms", which, in accordance with said selected source image Ij, take into account the respective real camera model corresponding to said selected source image.

4. A method as claimed in claim 3, characterized in that the step of calculating a luminance value (F) at said distortion corrected point (m) in said selected source image (Ij) includes performing an interpolation for computing a most probable value of a luminance function (F) at the address (Aq) in the source image (Ij).

5. A method as claimed in claim 1, characterized in that the step of calculating a luminance value (F) at said distortion corrected point (m) in said selected source image (Ij) includes performing an interpolation for computing a most probable value of a luminance function (F) at the address (Aq) in the source image (Ij).

6. An image processing device comprising: 2 a system of n fixed real cameras (C1, ..., Ci, Cj, ..., Cn) arranged in such a way that their individual fields of view merge so as to form a single wide-angle field of view for observation of a panoramic scene, said real cameras providing adjacent images referred to as source images;
    an image construction system simulating a mobile, virtual camera (Co) continuously scanning the panoramic scene so as to form a sub-image referred to as target image (Io) corresponding to a selected section of the wide-angle field of view and constructed from said source images (I1, ..., Ii, Ij, ..., In) furnished by the n real cameras, characterized in that said image processing device comprises:
    means for digitizing said source and target images;
    calibration means for determining a substantially common view point (P) to said images, and a fixed orthonormal landmark (Px, Py, Pz) originated at said common view point;
    an address generator for generating, pixel by pixel, respective addresses for the pixels of said target image (Io) so as to cover the entire target image (Io);
    an address computer for calculating, on the basis of an address (Ao) of a current pixel referred to as initial pixel (m') in the target image (Io), an orientation, in said fixed landmark, of a straight light ray (PM) passing through said initial pixel (m') and through said common view point (P), selecting a source image (Ij) traversed by said straight light ray (PM), calculating, from said orientation of said straight light ray (PM), an address (Aq) of a distortion corrected point (m), in said selected source image (Ij), said distortion corrected point (m) corresponding to said initial point (m'); and means for determining a luminance value (F) at said distortion corrected point (m), and assigning said luminance value to said initial point (m').

7. A device as claimed in claim 6, characterized in that the calibration means further comprises:

first storage means for storing the parameters relating to said virtual camera for supplying the address computer with a scale factor (zo) and orientation angles of the optical axis of said virtual camera (Co) in said fixed orthonormal landmark (Px, Py, Pz) which is independent of the cameras, said orientation angles being constituted by an azimuth angle ($\Theta$o), an angle of sight ($\phi$o) and an angle of rotation ($\psi$o);

second storage means for storing parameters relating to said real cameras (C1-Cn) for supplying said address computer with scale factor (z1-zn) and with orientation angles of an optical axis of each real camera (C1, ..., Ci, Cj, Cn), said orientation angles being constituted by azimuth angles ($\Theta 1$-$\Theta$n), angles of sight ($\phi 1$-$\phi$n) and angles of rotation ($\psi 1$-$\psi$n) defined in said fixed landmark.

8. A device as claimed in claim 7, characterized in that the address computer comprises:

first construction means for constructing a model (MCo) of the virtual camera with a projection via the view point P; and second construction means for constructing models (MC1-MCn) of the real cameras with a projection via the view point P and with corrections of distortions.

9. A device as claimed in claim 8, characterized in that the address computer comprises:

first means for computing a geometrical transform, referred to as "inverse perspective transform" ($H_0^{-1}$), to said initial pixel (m') at an address (Ao) of the image (Io) of the virtual camera (Co), in said inverse perspective transform, the model of the virtual camera (MCo) provided by said first construction means and the parameters constituted by the azimuth angle ($\Theta$o), the angle of sight ($\phi$o), the angle of rotation ($\psi$o) and the scale factor (zo) of said virtual camera provided by said first storage means being taken into account for determining, on the basis of said inverse perspective transform ($H_0^{-1}$), the positioning, in said landmark, of said straight light ray passing through said initial pixel (m') and through the view point (P);

means for storing the position of said straight light ray obtained by the inverse perspective transform ($H_o^{-1}$);

selection means for selecting a source image (I1-In) traversed by said straight light ray;

second means for computing a geometrical transform, referred to as "direct perspective transform" (H1-Hn), to said straight light ray in said landmark, said direct perspective transform, the models of the real cameras provided by the second construction means, the parameters constituted by the azimuth angles ($\Theta 1$-$\Theta$n), the angles of sight ($\phi 1$-$\phi$n), the angles of rotation ($\Theta 1$-$\Theta$n) and the scale factors (z1-zn) of the respective real camera (C1-Cn) corresponding to said selected source image provided by said second storage means being taken into account; and storage means for supplying, on the basis of said direct perspective transform (H1-Hn), an address (Aq) in said selected source image (I1-In) which corresponds to said straight light ray and thus to said initial pixel at the address (Ao) in the target image (Io).

10. A device as claimed in claim 9, characterized in that the means for determining the luminance comprise:

an interpolator for computing a most probable value (F) of a luminance function at the address (Aq) found by the address computer in said selected source image furnished by the selection means; and third storage means for assigning said computed luminance value (F) corresponding to the address (Aq) found in said selected source image to the initial pixel in the target image (Io) at the address (Ao) furnished by said address generator.

11. A device as claimed in claim 10, characterized in that said device further comprises a display system with a screen for displaying the target image (Io) in real time on said screen.

12. A device as claimed in claim 10, characterized in that the device further comprises a recording system for recording the target image (Io).

13. A device as claimed in claim 10, characterized in that the system for constructing the target image (Io) also comprises:

an interface for enabling a user to define said parameters of the virtual camera (Co), said parameters including the scale factor (zo) and the orientation of the optical axis ($\Theta$o, $\phi$o, $\psi$o).

14. A device as claimed in claim 13, characterized in that the user interface is controlled automatically or manually.

15. A device as claimed in claim 6, characterized in that the system for constructing the target image (Io) also comprises:

an interface for enabling a user to define parameters for the virtual camera (Co), said parameters including a scale factor (zo) and orientation angles ($\Theta$o, $\phi$o, $\psi$o) for the optical axis defined in said fixed landmark of said virtual camera.

16. A device as claimed in claim 6, characterized in that said device further comprises a display system with a screen for displaying the target image (Io) in real time on said screen.

17. A device as claimed in claim 6, characterized in that the device further comprises a recording system for recording the target image (Io).

* * * * *